United States Patent [19]

Liu et al.

[11] Patent Number: 5,279,109

[45] Date of Patent: Jan. 18, 1994

[54] GAS TURBINE ENGINE VARIABLE BLEED PIVOTAL FLOW SPLITTER

[75] Inventors: Hsin-Tuan Liu, West Chester; William R. Hines, Montgomery, both of Ohio

[73] Assignee: General Electric Company, Cincinnati, Ohio

[21] Appl. No.: 26,250

[22] Filed: Mar. 4, 1993

Related U.S. Application Data

[63] Continuation of Ser. No. 754,085, Sep. 3, 1991, abandoned.

[51] Int. Cl.[5] .......................... F02C 6/18; F02G 3/00
[52] U.S. Cl. .................................. 60/39.07; 60/39.092
[58] Field of Search ............ 60/39.07, 39.092, 39.161, 60/226.3, 751

[56] References Cited

U.S. PATENT DOCUMENTS

| | | | |
|---|---|---|---|
| 3,638,428 | 2/1972 | Shipley et al. | 60/226 |
| 3,964,257 | 6/1976 | Lardellier | 60/226 |
| 3,979,903 | 9/1976 | Hull, Jr. et al. | 60/39.09 |
| 4,250,703 | 2/1981 | Norris et al. | 60/39.09 |
| 4,346,860 | 8/1982 | Tedstone | 244/53 |
| 4,463,552 | 8/1984 | Monhardt et al. | 60/226 |
| 4,715,779 | 12/1987 | Suciu | 415/144 |
| 4,881,367 | 11/1989 | Flatman | 60/39.07 |
| 5,044,153 | 9/1991 | Mouton | 60/39.093 |
| 5,119,625 | 6/1992 | Glowacki | 60/226.3 |
| 5,123,240 | 6/1992 | Frost et al. | 60/39.092 |

FOREIGN PATENT DOCUMENTS

| | | |
|---|---|---|
| 0374004 | 6/1990 | European Pat. Off. . |
| 2658796 | 6/1978 | Fed. Rep. of Germany ..... 60/39.07 |
| 624402 | 6/1949 | United Kingdom . |
| 1389347 | 4/1975 | United Kingdom . |
| 2047815 | 12/1980 | United Kingdom . |
| 2074655 | 11/1981 | United Kingdom . |

OTHER PUBLICATIONS

"Energy Efficient Engine Preliminary Design and Integration Studies", Final Report by General Electric, Sep., 1978 pp. 153,155,158,159, and 161.

Primary Examiner—Richard A. Bertsch
Assistant Examiner—Howard R. Richman
Attorney, Agent, or Firm—Jerome C. Squillaro

[57] ABSTRACT

The present invention provides a gas turbine engine with a circumferentially disposed plurality of pivotal flow splitters between compressor sections to bleed off flow and remove particles, particularly ice in the case of an aircraft fan-jet gas turbine engine, by pivoting the leading edge of the splitter into the compressor flow thereby using the total pressure Q of the flow to drive bleed flows overboard and remove particles. In the preferred embodiment the pivotal flow splitter is integral with a booster variable bleed valve (VBV) door, and includes a booster bleed duct means having a bellmouth shaped inducer type inlet to enhance the capture of compressor flow and particle removal

12 Claims, 4 Drawing Sheets

GAS TURBINE ENGINE VARIABLE BLEED PIVOTAL FLOW SPLITTER

This application is a continuation of U.S. application Ser. No. 07/754,085, filed Sep. 3, 1991, now abandoned.

BACKGROUND OF THE INVENTION

1. Field of the Invention

This invention relates to gas turbine engines variable bypasses and particle removal and more particularly to variable bypass flow splitters integral with surge bleed doors that pivot into the engine flowpath in a transition section between the booster and core engine compressor sections.

2. Description of Related Art

It is well known in the gas turbine engine field to provide variable bleed valves (VBVs) having doors that open to provide a bleed path to bleed off compressed air between the booster and core engine compressor of gas turbine engines. Aircraft fan jet gas turbine engines and marine and industrial derivatives of such engines have employed various forms of curved flowpaths and VBV bleed doors that are retracted into the flowpath casing so as to form an entrance to a bleed duct that bleeds booster or low pressure compressor discharge airflow to draw particles out of the flowpath in a manner such as that disclosed in U.S. Pat. No. 4,463,552 entitled "Combined Surge Bleed and Dust Removal System for a Fan-Jet Engine" by Monhardt et. al. The problem with such systems is that amount and force of the bleed flow is dependent on the static pressure of the compressor airflow and is often not strong enough to remove larger pieces and amounts of particles such as ice. Because the bleed flow abruptly curves away from the direction of the compressor flow it is very difficult to hold larger particles in the bleed flow because of their momentum. This problem is common to aircraft, marine, and ground based gas turbine engines. Fan jet engines such as the General Electric CF6-80 series of engines have in series relationship a fan, a booster, and a core engine compressor whereby a portion of the air passing through the fan is ducted to the booster and then the core engine compressor. In order to match the inlet airflow of the core engine compressor to its flight operational requirements and to prevent booster stall a booster variable bleed valve (VBV) is provided in the form of a booster bleed duct having an inlet between the booster and the core engine compressor and an outlet to the fan duct. Opening and closing of the booster bleed duct is conventionally provided by a circumferentially disposed plurality of pivotal doors that retract into the engine structure or casing and are operated by a single unison ring powered by one or more fuel powered actuators. Bellcrank linkages operably connect the retracting pivotal bleed doors to the unison ring. An example of such a stall prevention system using a retracting pivotal door, as compared to a sliding door or valve in the Monhardt patent, is disclosed in U.S. Pat. No. 3,638,428 entitled "Bypass Valve Mechanism" by Shipley et. al. and assigned to the same assignee as the present invention and incorporated herein by reference The operation of the VBV is scheduled by the engine controller, either a mechanical or digital electronic type may be used.

The problem associated with conventional bleed valve ducts and valve doors is that larger particles and amounts of particles such as ice are often not drawn into the bleed duct. The present invention provides the ability to remove larger particles in greater amounts from the compressor airflow in a more efficient manner than has been previously possible Modern aircraft employ fewer of the higher thrust, fuel efficient, very-high-bypass engines such as the twin engine Boeing 767 aircraft. Aircraft with fewer engines require more total take-off power and more power per engine in order to satisfy the requirement of being able to fly with one engine out. Therefore, the engines are set to lower power settings resulting in less engine airflow during descent when all engines are operational. This results in high water content for engine airflow since the amount of hail or water that gets into the engine is the same so long as the aircraft speed remains the same. On the other hand, higher bypass ratio engines have smaller core flow and larger bullet-nose frontal area. This means more hail or water gets through the compressor into the combustor resulting in higher water content for the air. These two fundamental phenomena combine to cause substantial increase of water-to-air ratio in the combustor resulting in such aircraft engines being more susceptible to engine flame out problem in rain or hail storms.

Furthermore modern high bypass ratio engines incorporating higher pressure core compressors and lower pressure boosters produce less pressure difference between the booster exit and the fan bypass duct. Therefore, it increases the difficulties of bleeding sufficient amounts of air from downstream of the booster to the fan bypass duct for protecting boosters from stall. The current invention fully utilizes the dynamic pressure head to increase bleed capability.

Industrial and marine derivatives of aircraft engines, generically referred to as ground based gas turbine engines or derivative engines, generally replace propulsive elements such as the fan and exhaust nozzle of an aircraft gas turbine engine with a load means such as an electrical generator, ship or marine propeller, or pump (e.g. natural gas pump). Electrical generator gas turbine engines are required to operate at a constant RPM such as 3000 RPM or 3600 RPM in order to generate electricity at a constant 50 Hz or 60 Hz respectively so as to be synchronized with the electrical grid network for which they are used to supply electricity.

Two general types of derivative engines are free turbine and direct drive engines. Free turbine types employ a free power turbine that drives the load and is not directly mechanically coupled to a compressor (usually the booster or low pressure compressor of a multiple rotor engine) of the gas generator used to power the free power turbine. The direct drive turbine is directly mechanically coupled to both a compressor of the gas turbine engine and to the load on a common rotor that is most often the low pressure rotor of a dual rotor gas turbine engine.

A difficult problem is bringing a multiple rotor direct drive engine system to a no-load synchronous speed condition prior to locking in on an electrical grid network which would then hold the low pressure (LP) rotor attached system in a synchronous speed mode. The problem is how to reach zero shaft horsepower (SHP) output with the LP system at synchronous speed without stalling the booster compressor so as to connect and disconnect the gas turbine driven generator from the electrical grid network while not overspeeding the LP system.

The booster stall margin must be controlled by controlling either the inlet flow of the booster or by controlling the booster discharge flow level entering the compressor. Typically booster discharge bleed doors are opened to dump some of the booster flow overboard so as to control the booster operating line to a point below its stall line. Aircraft engine VBV doors normally are inadequate to allow such operation even with state-of-the-art variable inlet guide vane (VIGV) closure on the booster. Current VBV door sizes can be up to 2 times too small to reach this condition.

In adapting an aircraft engine as a derivative for this type of application, since LP speed is held constant to very low powers, a means is needed to minimize required engine changes to accomplish a no-load synchronous speed. For example, it is estimated that for an industrial derivative of the CF6-80C2 engine its VBV bleed doors wide open will only flow 50% of the bleed flow needed to set the booster operating line no higher than its maximum allowable pressure ratio. For example, either the VBV flow area must be doubled or the booster inlet flow must bereduced from 145 lb/sec down to 105 lb/sec.

In accomplishing this, the inlet flow to the core engine compressor must not suffer increased pressure or temperature distortion which could stall the compressor and possibly harm the engine. It is well known that variable inlet guide vanes on boosters and compressors may be used to control the amount of inlet flow and boost pressure at a constant rotor speed by their changing of incidence flow angles to the rotors but it is very difficult if not impossible to avoid stalling the booster or low compressor using this method.

SUMMARY OF THE INVENTION

The present invention provides a gas turbine engine with a circumferentially disposed plurality of pivotal flow splitters and a means to pivot the leading edges of the splitters into the compressor flowpath thereby fully using the dynamic pressure head (Q) of the flow to maximize the bleed air flowrate and improve particle removal.

One embodiment provides an aircraft gas turbine engine having a VBV between a booster and core engine compressor sections including a flow splitter integral with a VBV door such that the splitter's leading edge can be pivoted into the compressor flowpath between two compressor sections of two respective rotors. This apparatus uses Q to enhance the particle removal process to remove dirt, ice, and other particles from the compressor flowpath of a gas turbine engine and to enhance the VBV function by increasing the flowrate.

The preferred embodiment provides a boundary layer suction means in the form of sealable boundary layer flow leakage paths along the hinge line and sides of the pivotal splitter or door that are exposed when the door is opened and covered when the door is closed. This reduces the possibility and degree of boundary layer separation and stalling of the core compressor downstream of the splitter.

The preferred embodiment also provides a controlled diffusion surface on the engine flow side of the door that is effective to prevent flow separation when the door is fully deployed thereby preventing distorted flow from entering and possibly even stalling the core compressor downstream of the splitter.

The preferred embodiment includes sidewalls along the sides of the door forming a chute and a roof attached to the top of the chute walls over the door to form a scoop. In the preferred embodiment the scoop is in the form of a duct that is integral with the booster variable bleed valve (VBV) door and the booster bleed duct means includes an inducer type inlet in having a bellmouth inlet duct operably positioned to receive bleed flow from the scoop and capture the bleed flow's dynamic pressure.

The present invention has the advantage of using the dynamic pressure of the engine flowpath in order to more effectively remove particles from the engine flowpath than particle removal apparatus found in the prior art. Another advantage of the present invention is that it allows the use of an inducer in the bleed duct means to further enhance the particle removal process of the gas turbine engine.

Another embodiment of the present invention is for a ground based gas turbine engine, preferably a derivative of an aircraft gas turbine engine. The preferred embodiment employs a dual rotor, high pressure and low pressure, direct drive derivative gas turbine engine powering an electrical generator wherein the generator is directly coupled to the low pressure, or booster, compressor section. The engine's VBV, located between booster and core engine compressor sections is provided with a pivoting flow splitter integral with a VBV door such that the splitter's leading edge can be pivoted into the compressor flowpath between two compressor sections of two respective rotors.

This apparatus uses Q to enhance the VBV's flow bleed operation so as to provide a way to bring the electrical generator to a no-load synchronous speed condition prior to locking in on an electrical grid network without stalling the booster compressor. The invention also provides a means to bring the electrical generator to a no-load synchronous speed condition prior to disconnecting the generator from the electrical grid network without stalling the booster compressor including a quick full power fuel stopcock, wherein conventionally, IGV's are slammed close and VBV's are slammed open.

BRIEF DESCRIPTION OF THE DRAWINGS

The foregoing aspects and other features of the invention are explained in the following description, taken in connection with the accompanying drawings where:

FIG. 2a is cross-sectional view of a sealable boundary layer flow leakage paths along the sides of the pivotal splitter of the apparatus in FIG. 2.

FIG. 2b is cross-sectional view of a sealable boundary layer flow leakage paths along the hinge line of the pivotal splitter of the apparatus in FIG. 2.

DETAILED DESCRIPTION OF THE INVENTION

Figure 1:
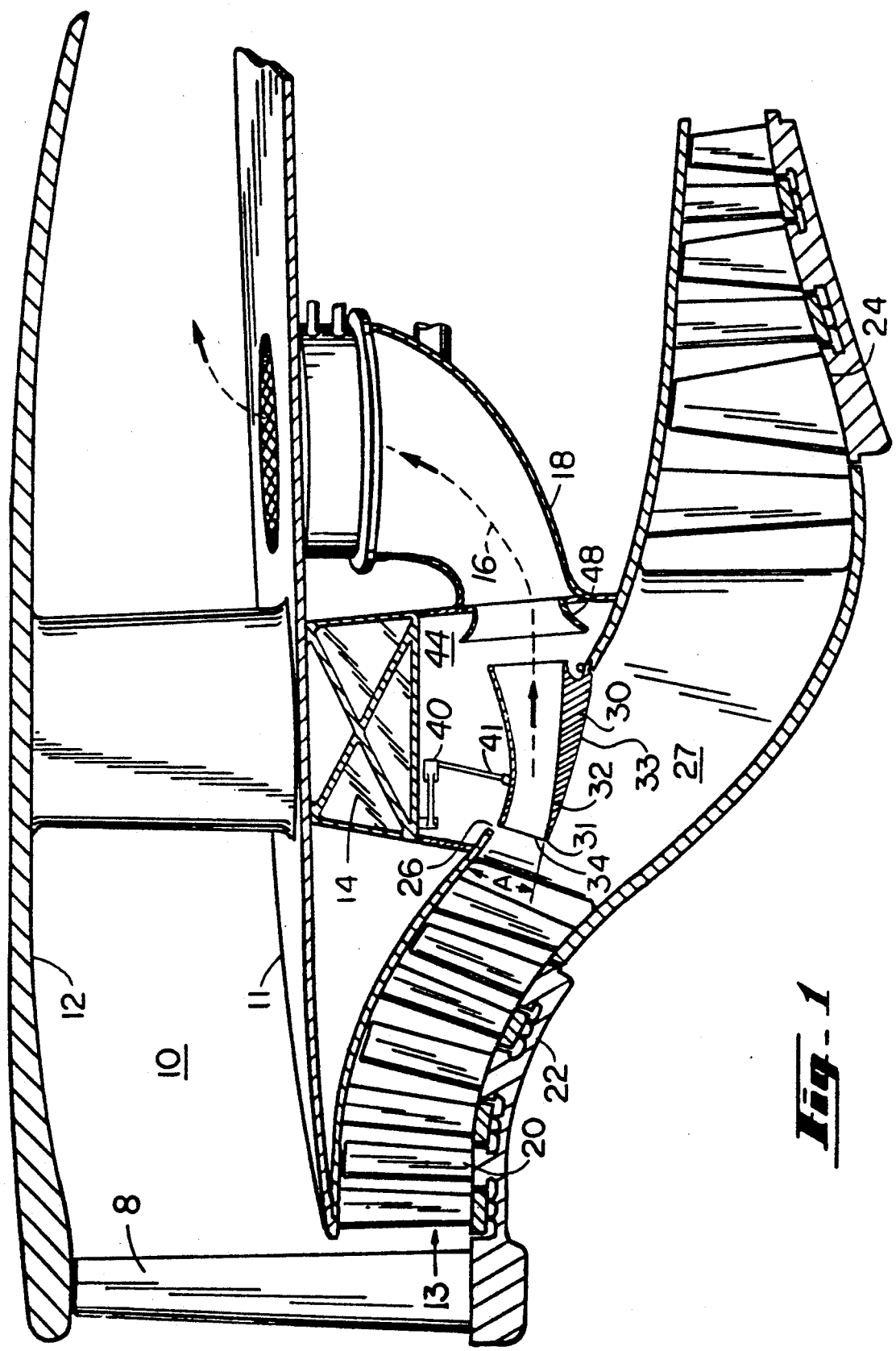
FIG. 1 is a cross-sectional view of a fan and compressor section of a fan-jet gas turbine engine having a pivotal flow splitter in accordance with one embodiment of the present invention.

A first embodiment of the present invention is illustrated in FIG. 1 for a fan-jet gas turbine engine (not fully shown) having a fan 8 that pressurizes and feeds air to a fan bleed duct 10 disposed between an inner fan case 11 and an outer fan case 12 and to an engine core-flowpath 13. A booster 20 located at a forward portion of engine core flowpath 13 rotates together with fan 8 on a low pressure rotor 22 driven by a conventional low pressure turbine (not shown) and further compresses air that is then ducted to a conventional engine core compressor 24.

A circumferentially disposed plurality of booster bleed paths 16 indicated by the arrows and dotted line labeled 16 are radially disposed between engine core flowpath 13 and fan bleed duct 10 employing fan struts 14 as sidewalls and a radially outwardly disposed bleed duct 18. A booster bleed inlet 26, an opening, is disposed in the wall of a transition duct 27 between booster 20 and engine core compressor 24 in engine core flowpath 13 and is controlled by the engine's VBV system as illustrated by a VBV door 30 which serves as a pivotal flow splitter having a leading edge 31 that controls and schedules booster bleed air.

VBV door 30 and leading edge 31 are arranged to pivot into the compressor flowpath between booster 20 and engine core compressor 24 to split off and bypass a portion of the flow in transition duct 27 and remove the particles entrained in that flow portion. Note that flowpath 13 through booster 20 is curved radially inward thus subjecting the particles entrained in the air flow of engine core flowpath 13 to a sudden flow direction change which cannot sufficiently overcome the larger momentum of the particles. Therefore the particles are intercepted by VBV door 30 and directed into bleed path 16.

Engine core flowpath 13 is curved radially inward through booster 20 and radially outward through engine core compressor section 24 in a quasi sinusoidal shape defining a transition section 27 between booster 20 and core compressor section 24. Engine core flowpath 13 through transition section 27 has aerodynamically curved sidewalls that smoothly expand the airflow therethrough to prevent flow separation prior to entry to engine core compressor 24. A controlled diffusion surface 33 is provided on the transition duct side of VBV door 30 such that surface 33 is aerodynamically curved so as to prevent separation of the flow along the surface.

As illustrated in FIG. 1, pivotal VBV door 30 is disposed in booster bleed inlet 26 and is operable to pivot through a variable angle A, defining the fully open and closed positions of VBV door 30, in order to vary the amount of flow passing through booster bleed paths 16 that are circumferentially disposed around the engine. Angle A and hence the flow rate of booster bleed air is controlled by a VBV control system (not shown) as is conventionally known and used in the art. Opening and closing of VBV doors 30 is conventionally provided by bellcrank linkages 40, located in a chamber generally shown at 44, that are actuated by a single unison ring powered by one or more fuel powered actuators (not shown). Surface 33 is preferably designed to prevent separation at a maximum angle A, which has been found to preferably be about 20 degrees.

Figure 2:
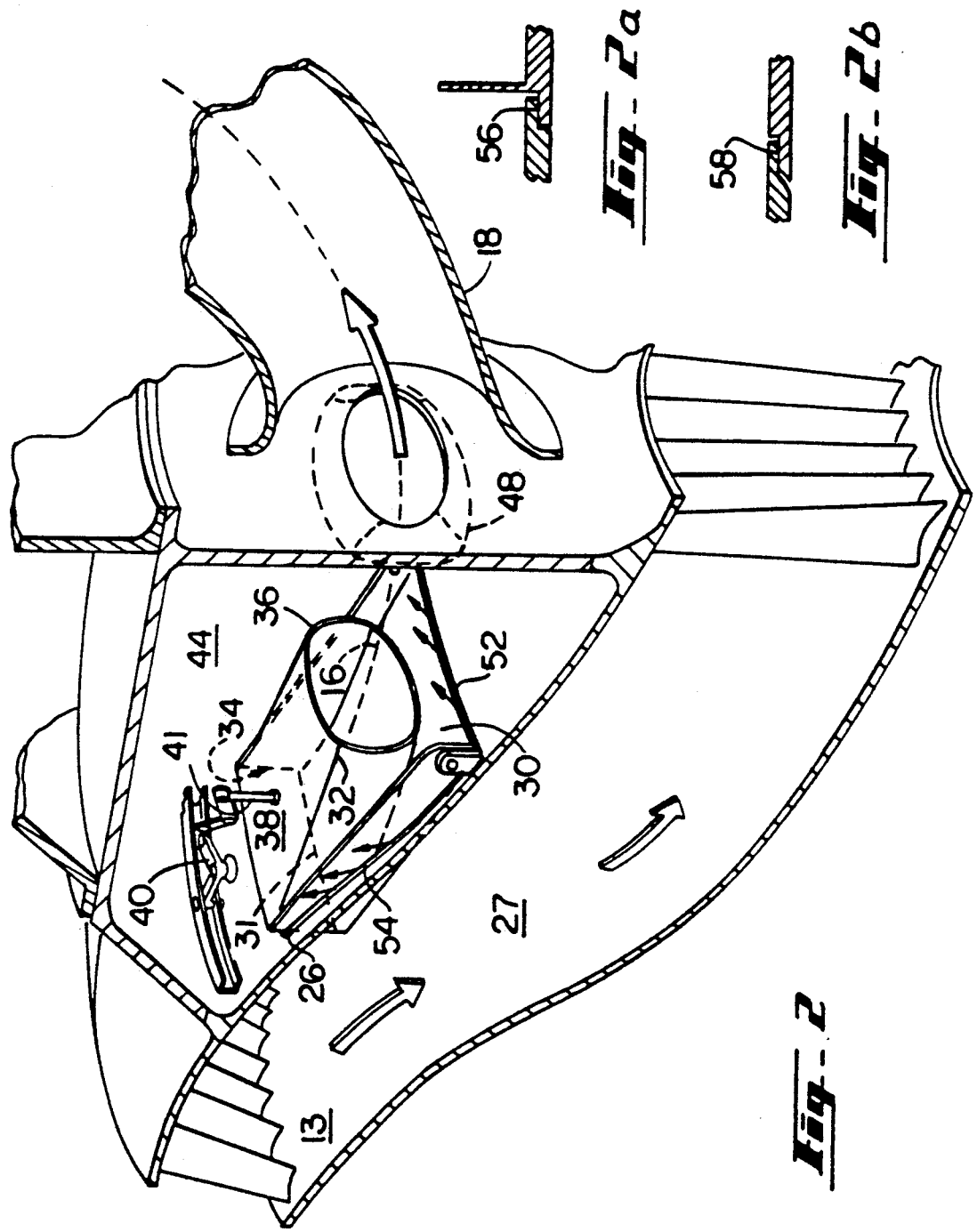
FIG. 2 is a partial perspective view, aft looking forward, of the apparatus of FIG. 1.

Referring to FIGS. 1 and 2, VBV door 30 and its leading edge 31 pivots into engine core flowpath 13 and includes a scoop 32 having a relatively wide scoop inlet 34 converging to a relatively narrow scoop outlet 36 and a contoured converging scoop passage 38 therebetween.

Scoop inlet 34 including leading edge 31 faces into the flow of the engine so as to scoop up both engine core airflow and particles entrained in the portion of the flow crossing scoop inlet 34. Scoop 32 and its contoured contracting scoop passage 38 is designed to enhance the flow through booster bleed paths 16 and into bleed duct 18. To further enhance this flow, chamber 44 includes a bellmouth shaped inducer inlet 48 wherein the cross-section of the opening of inducer inlet 48 is of a size and shape generally corresponding to that of scoop outlet 36 but is appreciably larger.

Note that an actuating rod 41 of linkage 40 is attached to the top of scoop 32 thereby not producing any aerodynamic interference with the operation of scoop 32.

A boundary layer suction means, depicted in FIG. 2 as sealable boundary layer flow leakage paths along VBV door hinge line 52 and side lines 54 of pivotal door 30 that are exposed when the door is opened and covered when the door is closed. The leakage flow, indicated by lines of leakage arrows along VBV door hinge line 52 and side lines 54 of pivotal door 30, reduces the possibility and degree of boundary layer separation and stalling of the core compressor downstream of the splitter. A side line shiplap seal 56 in FIG. 2A and a hinge line shiplap seal 58 in FIG. 2B provide a deployable sealing means for their respective boundary layer flow leakage paths. A similar leading edge shiplap seal may be used in conjunction with leading edge 31 to help fully seal the opening, booster bleed inlet 26, when door 30 is in the closed position.

Figure 3:
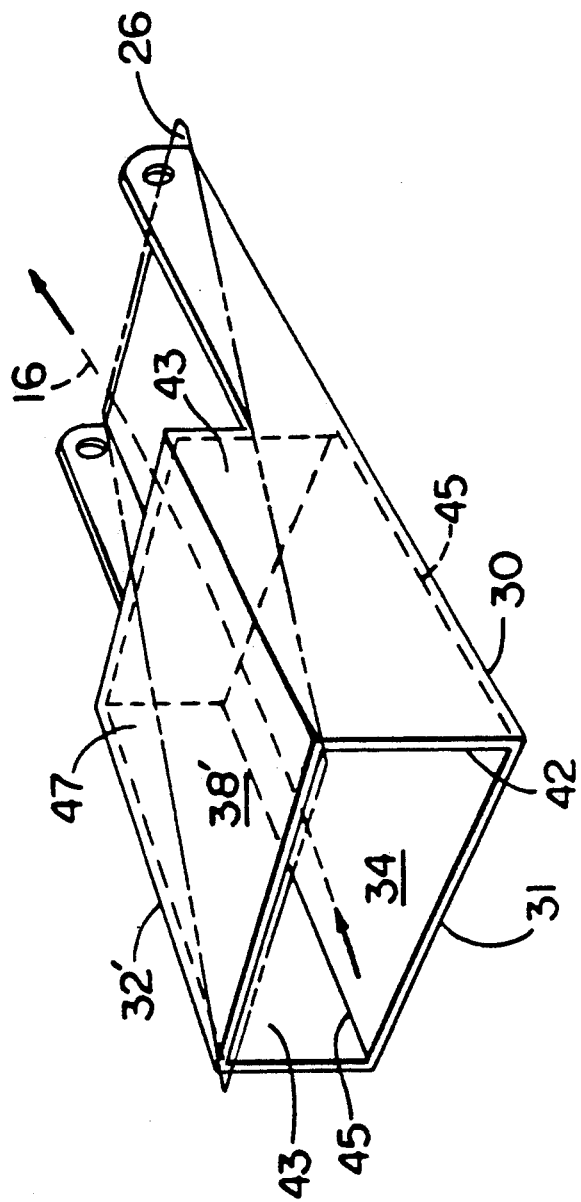
FIG. 3 is a perspective view of a scoop assembly for a pivotal splitter in accordance with an alternate embodiment of the present invention.

Alternate embodiments to pivotal splitter 30 integral with scoop 32 having a contoured scoop passage 38 as illustrated in FIG. 2 are illustrated in FIG. 3. A chute 42 is formed by attaching sidewalls 43 to sides 45 of VBV door 30 from aft of its leading edge 31 forming an alternate scoop passage 38'. Scoop 32' is formed by the addition of a roof 47 to sidewalls 43 of chute 42 and includes a scoop inlet 34. Alternative embodiments may provide either a door 30 or a chute 42 alone as a pivotal splitter that would pivot open into core engine flow 13 so as to provide a pivotal splitter for booster bleed inlet 26 that faces into the engine flow and could capture the particles entrained in core engine flow 13 and direct them into bleed path 16.

Figure 4:
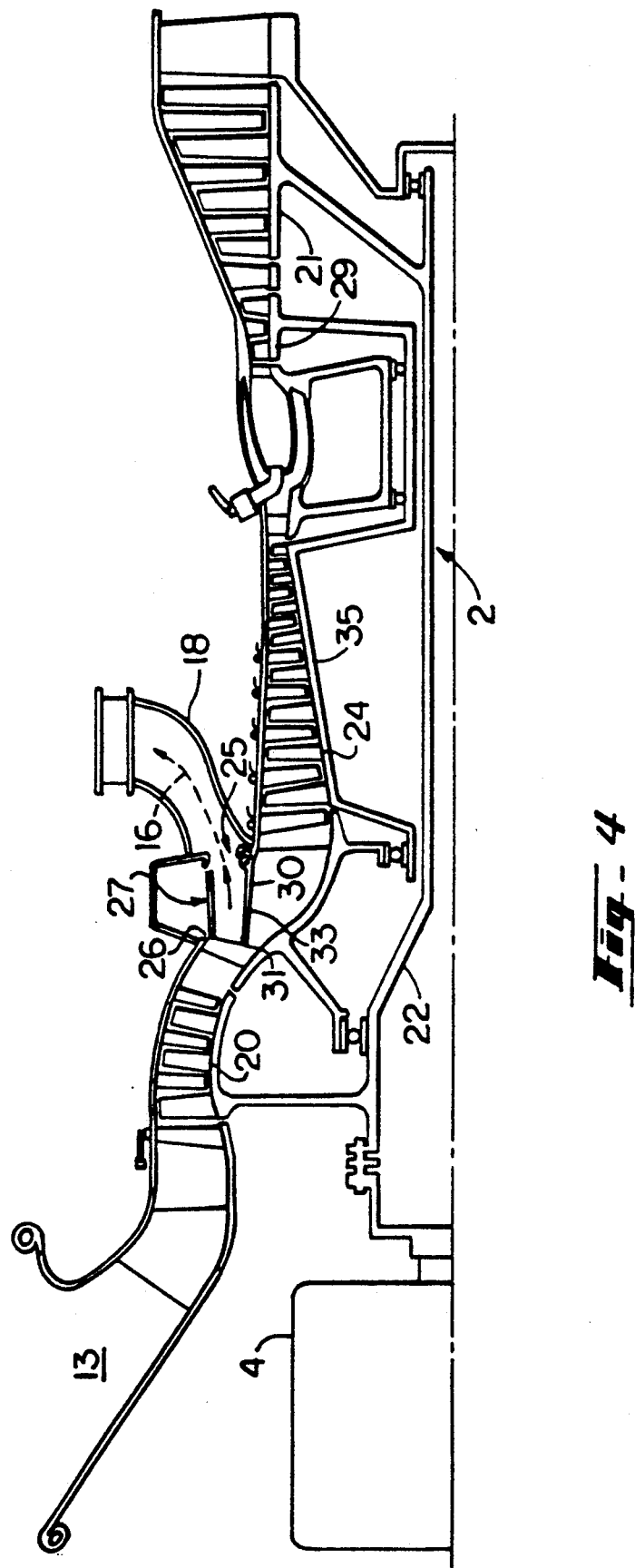
FIG. 4 is a cross-sectional view of a derivative dual rotor direct drive gas turbine engine driving an electrical generator having a pivotal flow splitter in accordance with another embodiment of the present invention.

A second embodiment of the present invention is illustrated in FIG. 4 for a derivative gas turbine engine 2 of an aircraft gas turbine engine illustrated in FIG. 1. An electrical generator 4 is powered by derivative gas turbine engine 2 having a booster 20 located at a forward portion of engine core flowpath 13. Booster 20 rotates on a low pressure rotor 22 driven by a conventional low pressure turbine 21 that also drives electrical generator 4 directly coupled to low pressure rotor 22. A core engine compressor 24 is located downstream of booster 20 and is driven by a core engine turbine 29 through a high pressure rotor 35.

A circumferentially disposed plurality of booster bleed valves 25 having booster bleed inlets 26 are disposed in a wall of a transition duct 27 between booster 20 and engine core compressor 24 in engine core flowpath 13. VBV 25 is controlled by the engine's VBV system as illustrated by a VBV door 30 which serves as a pivotal flow splitter having a leading edge 31. VBV 25 controls and schedules booster bleed air for derivative gas turbine engine 2.

VBV door 30 and leading edge 31 are arranged to be pivoted into the compressor flowpath between booster 20 and engine core compressor 24 in a manner similar to that of the aircraft fan-jet gas turbine engine illustrated in FIG. 1. However, note that VBV door 30 for a derivative gas turbine engine 2 as illustrated herein is preferably longer than one for an aircraft gas turbine engine. This provides for bleeding or bypassing a larger amount of flow while retaining a relatively small door opening variable angle A to prevent separation along a controlled diffusion surface 33' of door 30.

Inducers similar to those illustrated by bellmouth shaped inducer inlet 48 in FIGS. 1 and 2 may also be used downstream of VBV 30 in the flow along booster bleed path 16 to enhance the bleed process as described above and illustrated in FIG. 1.

The invention has been described for use in a fan-jet aircraft gas turbine engine and a derivative gas turbine engine powering an electrical generator. However, it is contemplated for use in other gas turbine engines including other derivative engines such as marine and industrial gas turbine engines. Also contemplated are engines having more than two rotors.

Scheduling the opening of VBV door 30 to its maximum position is preferably a function dependent on one or more engine operating conditions. It has been found preferable to calibrate the door's opening schedule as a function of booster speeds and core engine speeds for a dual rotor direct drive derivative engine as depicted in FIG. 4. More particularly, the door opening schedule could be a function of the following parameters, booster corrected speed ($N_2/\sqrt{\Theta_2}$) or core speed corrected to the core compressor inlet conditions ($N_{25}/\sqrt{\Theta_{25}}$), whereby:

$N_2$ is the physical or directly measured rotational speed of low pressure rotor 22, ($\Theta_2$) is the ratio of the booster 20 inlet temperature $T_2°R/519°$ R. and 519° R. corresponds to an industry standard 59° F. day, $N_{25}$ is the physical or directly measured rotational speed of high pressure rotor 35, and ($\Theta_{25}$) is the ratio of core engine compressor 24 inlet temperature $T_{25}°R/519°$ R.

While the preferred embodiment of the present invention has been described fully in order to explain its principles, it is understood that various modifications or alterations may be made to the preferred embodiment without departing from the scope of the invention as set forth in the appended claims.

We claim:

1. A gas turbine engine driven apparatus comprising:
   a load means driven by a low pressure rotor of a gas turbine engine having a booster compressor drivenly connected to a low pressure turbine on said low pressure rotor;
   a core engine compressor downstream of said booster compressor along a core engine flowpath and drivenly connected to a high pressure turbine on a high pressure rotor;
   a variable bleed valve bleed apparatus for bleeding a portion of flow from said core engine flowpath, said variable bleed valve having a bleed passage opening along said core engine flowpath disposed between said booster compressor and core engine compressors; and
   a bleed door to close said bleed passage opening, said bleed door comprising a pivotal flow splitter having a leading edge and a means to pivot said bleed door and said leading edge about a point substantially aft of said leading edge and into said core engine flowpath.

2. A gas turbine engine driven apparatus as claimed in claim 1 wherein said load means is an electrical generator.

3. A bleed apparatus for a gas turbine engine for bleeding flow from the core engine flowpath, said bleed apparatus comprising:
   a booster variable bleed valve (VBV) disposed between a booster and an engine core compressor in the engine core flowpath, said VBV including a VBV door;
   a bleed passage opening along the engine flowpath;
   said VBV door comprising a pivotal flow splitter having a leading edge to split off a portion of the flow in the core engine flowpath through said opening; and
   a means to pivot said VBV door about a point substantially aft of said leading edge such that said leading edge and said VBV door can be pivoted into the core engine flowpath.

4. A bleed apparatus as claimed in claim 1 further comprising an inducer in downstream flow communication with said bleed passage opening.

5. A bleed apparatus for a gas turbine engine as claimed in claim 3 further comprising:
   a hinge line along the aft end of said flow splitter,
   sealable boundary layer flow leakage paths along said hinge line and side lines of said pivotal flow splitter, and
   a seal means effective to seal said leakage paths when said pivotal splitter is withdrawn from the core engine flowpath closing said bleed passage opening.

6. A bleed apparatus for a gas turbine engine as claimed in claim 3 further comprising a controlled diffusion surface disposed on a side of said pivotal splitter facing the core engine flow such that said controlled diffusion surface is aerodynamically curved to prevent separation of the core engine flow along said surface.

7. An aircraft gas turbine engine comprising:
   a booster compressor drivenly connected to a low pressure turbine on a low pressure rotor;
   a core engine compressor downstream of said booster compressor along a core engine flowpath and drivenly connected to a high pressure turbine on a high pressure rotor;
   a variable bleed valve bleed apparatus for particle removal and bleeding flow having a bleed passage opening along the core engine flowpath disposed between said booster and core engine compressors;
   a bleed door to close said opening, said bleed door comprising a pivotal flow splitter having a leading edge; and
   a means to pivot said bleed door and leading edge about a point substantially aft of said leading edge and into said core engine flowpath.

8. An aircraft gas turbine engine as claimed in claim 7 further comprising a chute having two sidewalls attached to sides of said bleed door extending into said opening.

9. An aircraft gas turbine engine as claimed in claim 8 further comprising a scoop having a roof disposed between and extending aft, away from said leading edge, along at least a portion of said sidewalls and said scoop having an inlet being at the front of said scoop.

10. An aircraft gas turbine engine as claimed in claim 9 further comprising a bleed duct in fluid communication with said bleed passage and operable to convey a portion of flow bled from said flowpath by said variable bleed valve bleed apparatus from said scoop to a point outboard of said flowpath.

11. An aircraft gas turbine engine as claimed in claim 10 further comprising:
   a variable bleed valve (VBV) means wherein said door is a variable bleed door integral with said scoop and said bleed passage includes a VBV duct having an outlet aft of a fan of the gas turbine engine.

12. An aircraft gas turbine engine as claimed in claim 11 further comprising a bell mouth shaped inducer inlet on said VBV duct spaced apart from said scoop.

* * * * *